(12) United States Patent
Schliemann et al.

(10) Patent No.: US 8,104,138 B2
(45) Date of Patent: Jan. 31, 2012

(54) PORTABLE HANDHELD SUCTION/BLOWER APPARATUS

(75) Inventors: Harald Schliemann, Waiblingen (DE); Manfred Rabis, Schwaikheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 994 days.

(21) Appl. No.: 11/356,050

(22) Filed: Feb. 17, 2006

(65) Prior Publication Data

US 2006/0182502 A1    Aug. 17, 2006

(30) Foreign Application Priority Data

Feb. 17, 2005    (DE) .......................... 10 2005 007 298

(51) Int. Cl.
    *A47L 9/00*    (2006.01)
(52) U.S. Cl. ............................ 15/330; 15/345
(58) Field of Classification Search .............. 15/330.345
    See application file for complete search history.

(56) References Cited

U.S. PATENT DOCUMENTS

| 3,455,580 | A | * | 7/1969 | Howard | ........................... | 285/87 |
| 6,108,861 | A | * | 8/2000 | Vystrcil et al. | .................. | 15/323 |
| 6,108,865 | A | * | 8/2000 | Veser et al. | ...................... | 15/414 |
| 6,647,586 | B2 | * | 11/2003 | Rogers et al. | ................ | 15/327.5 |
| 2010/0211014 | A1 | * | 8/2010 | Klint et al. | ..................... | 604/173 |

FOREIGN PATENT DOCUMENTS

GB    242874    11/1925

* cited by examiner

*Primary Examiner* — Joseph J Hail
*Assistant Examiner* — Shantese McDonald
(74) *Attorney, Agent, or Firm* — Walter Ottesen

(57) ABSTRACT

A portable handheld suction/blower apparatus includes a motor-driven blower (1) and at least one air guide tube (3) connected to the blower (1) at a connecting location (2) to conduct flow. The connecting location (2) is configured at least as a double-winding connection (9) which has pairs of outer thread sections (4) of an outer winding (5) and inner thread sections (7) of an inner winding (8). The pairs are distributed about the periphery of the threaded connection. The periphery of the connecting location (2) is subdivided by the number of pairs of thread sections (4, 7) into a corresponding number of angular segments (10). The sum of angular extents ($\alpha$, $\beta$) of a pair of individual thread sections (4, 7) is in total less than an angular extent ($\gamma$) of the corresponding angular segment (10).

8 Claims, 10 Drawing Sheets

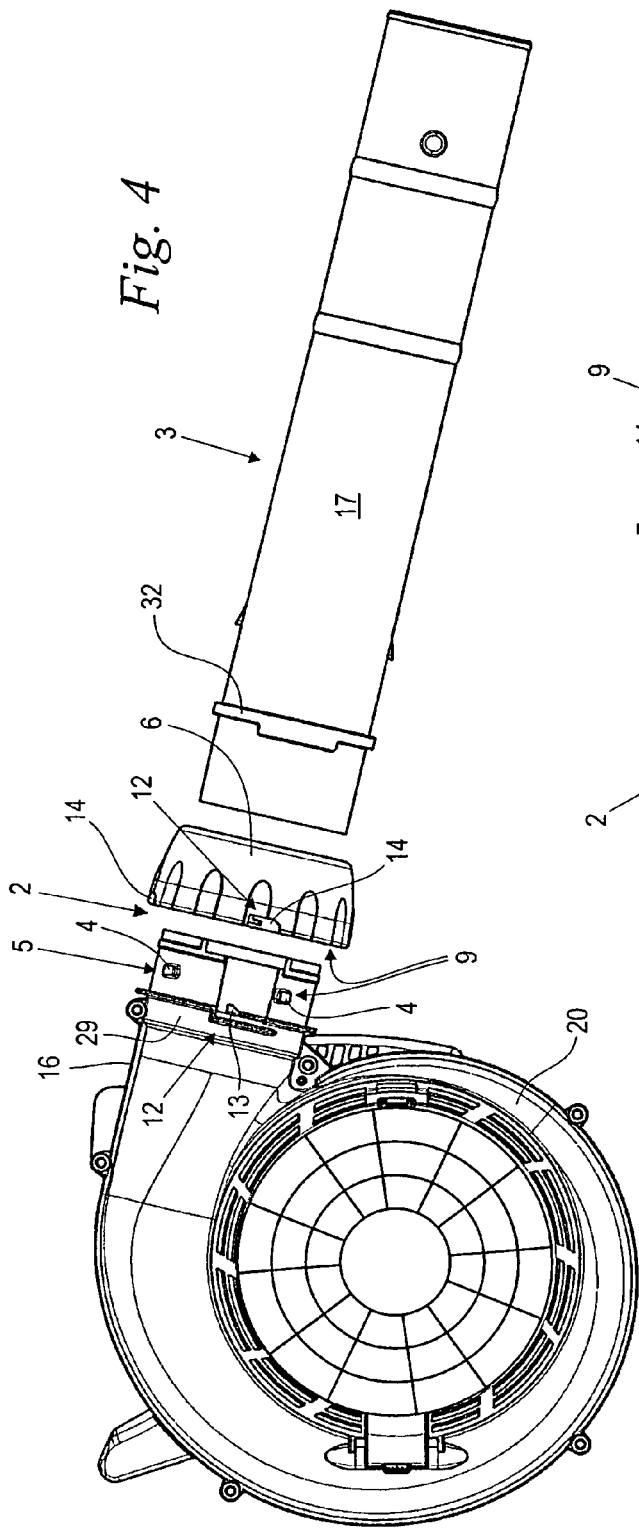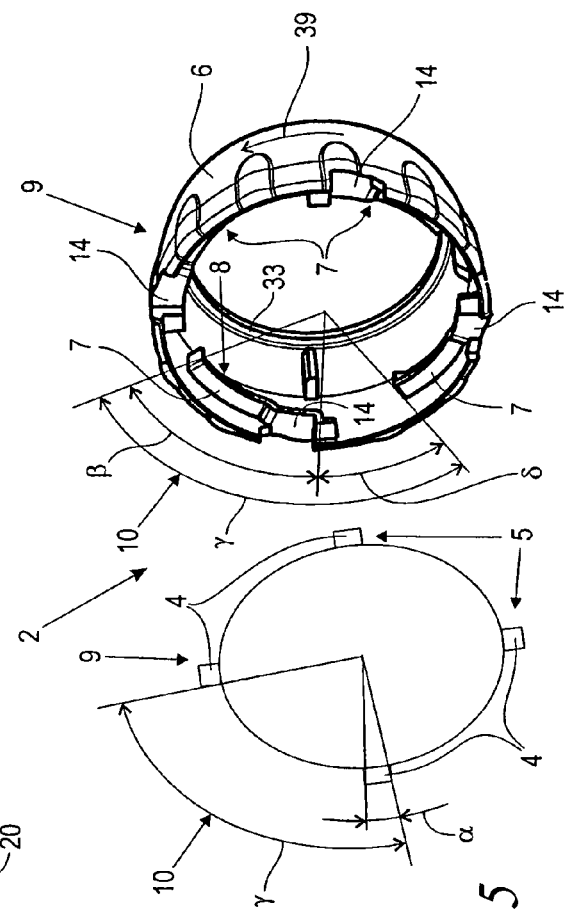

PORTABLE HANDHELD SUCTION/BLOWER APPARATUS

CROSS REFERENCE TO RELATED APPLICATION

This application claims priority of German patent application no. 10 2005 007 298.4, filed Feb. 17, 2005, the entire content of which is incorporated herein by reference.

BACKGROUND OF THE INVENTION

Portable handheld suction/blower apparatus include in various embodiments either a handle unit on which they are carried and guided during operation or they are equipped with a back carrier frame by means of which a back-carried operation is possible. A blower is provided which is driven by an internal combustion engine or an electric motor and generates an air flow. A guide tube conducts flow and is connected to the blower at a connecting location. The guide tube guides the blower air flow into a direction wanted by the operator.

During blower operation, a blower tube is provided for forming an embodiment of the air guide tube and this blower tube is attached to a connecting location at a discharge stub of the blower. The air flow, which is moved by the blower, is guided out from the blower through the blower tube. The blower tube can be directed against a ground surface to be cleaned by the operator whereby, for example, leaves can be blown together to a pile.

Beyond a pure blower function, embodiments are also known which make a suction operation possible. Here, a suction tube and a discharge tube form various configurations of an air guide tube. The suction tube is attached to the blower in the region of the intake opening while the discharge tube is arranged in lieu of the above-described blower tube. During operation, the suction tube can be directed against the ground surface to be cleaned. Leaves, dirt or the like can be drawn in by suction with the blower air flow and can be discharged at the output end of the blower via the discharge tube. The discharge tube opens into a receptacle bag for the inducted material.

A releasable configuration of the connecting locations is provided for the transport of the suction/blower apparatus, the exchange of defective air guide tubes and especially for a retrofit of the suction/blower apparatus between the above-described blower configuration and the suction configuration. By means of a suitable bayonet connection, the individual tube elements can be attached, disconnected or exchanged.

A suction/blower apparatus is disclosed in British patent publication 242,874 wherein a suction tube and a blower tube form an air guide tube which can be disassembled. The corresponding connecting location is configured as a bayonet connection which includes, at one side, a twice interrupted annular flange projecting outwardly and, on the opposite-lying side, two lugs which project radially inwardly. The annular flange is configured to be planar at the end and is placed for assembly on the opposite-lying lugs. Then there is a rotation until the lugs can be passed in axial direction through the interruptions of the annular flange. The two interrupted component sections of the annular flange are configured as inclined ramps on their axial rearward sides. With a rotation, the inclined surfaces effect an axial tightening by coacting with the lugs lying thereagainst.

It is disadvantageous in the above-described arrangement that an axial introduction is possible only with such a relative rotational angular position of the bayonet connection wherein the lugs are in exact alignment with the interruptions of the annular flange. Slight deviations in the rotation angular position, which are recognizable by the operator only with difficulty, lead to the condition that the planar end of the annular flange lies against the lugs without an indication to the operator in which rotational direction an angular correction is required. A determination of the suitable rotational angular position by touching by the operator is hardly possible. Several attempts must be undertaken until, by chance, the lugs can be passed through the cutouts of the annular flange in axial direction.

SUMMARY OF THE INVENTION

It is an object of the invention to improve a suction/blower apparatus of the kind described above in such a manner that a simplified and reliable assembly of the air guide tube is possible.

The portable handheld suction/blower apparatus of the invention includes: a motor-driven blower; an air guide tube for conducting a flow of air therethrough generated by the motor-driven blower; the motor-driven blower and the air guide tube conjointly defining a connecting interface whereat the air guide tube is connected to the motor-driven blower; the connecting interface defining a periphery and being configured as at least a two-thread thread connection; the thread connection including a number of pairs of outer thread sections of an outer winding and inner thread sections of an inner winding; the periphery of the connecting interface being subdivided into a corresponding number of angular segments; and, the sum of the angular extents ($\alpha$, $\beta$) of a pair of individual ones of the outer and inner thread sections being overall less than an angular extent ($\gamma$) of the angular segment corresponding to the pair.

A suction/blower apparatus is suggested wherein the connecting location or connecting interface is configured at least as a two-threaded connection which includes pairs of outer thread sections of an outer winding and inner thread sections of an inner winding distributed over the periphery of the connecting location. The periphery of the connecting location is subdivided by the number of pairs of thread sections into a corresponding number of angular segments. The sum of the angular extents of a pair of individual thread sections is, in total, less than an angular extent of the corresponding angular segment.

Two realizations are the basis of the invention. On the one hand, with the above-mentioned relationship of the angular extents, it is achieved that the free spacing of two mutually adjacent thread sections in the peripheral direction is greater than the peripheral or angular extent of the thread section of the opposite-lying connecting location end which is to be passed through between the mutually adjacent thread sections in axial direction. There results a comparatively large angular region wherein the outer winding can be placed upon the inner winding without the thread sections, which form respective pairs, colliding with each other. In such a rotational angular position, which is selected by the operator by chance, the thread sections of the one end can easily be passed through the thread sections of the other end in axial direction in the case mentioned above. With a subsequent short rotational movement, the pairs of thread sections are brought rearwardly into contact engagement and generate an axial tightening.

The second recognition relates to the case wherein the operator, during assembly, selects by chance a rotational angular position wherein with the axial pushing on, the pair of thread sections strike each other. The operator can, by feel, obtain a required rotational angle correction without optical control. When pushing on, the inclined position of the threads generates a more or less deep lying stop which can be felt by the operator. The axial dimension as to how deep the one thread part can be introduced into the opposite-lying thread part can be estimated by the user as a dimension as to how far a relative rotational angle correction is required in the closing direction until the threaded connection engages and can be pulled tight. Furthermore, an estimate of this kind is possible but not absolutely necessary. The inclined position of the thread sections causes that, by a simple rotation in the closing direction, the thread sections, which at first are stuck in axial direction, are axially guided inwardly and are brought into engagement with the assigned opposite-lying thread sections. Even in the most unfavorable situation of a freely selected rotational angle position, maximally only a small rotational path of the thread connection is required in order to effect a tightening.

In an advantageous embodiment, the sum of the angular extents of a pair of thread sections is not more than 75% and especially is not more than approximately half of the angular extent of the corresponding angular segment. This has been shown to be an advantageous compromise between the capacity of the thread sections and the small required rotational movement when closing or opening the threaded connection.

In a preferred embodiment, an individual thread section, especially of the outer winding, has a smaller angular extent than the angular extent of the opposite-lying threaded section, especially, of the inner winding. An individual thread section of the pair of thread sections can be configured correspondingly large in the peripheral direction without increasing the total angular extent of the pair. The individual angular section, which is configured correspondingly large, permits a correspondingly large angular tightening path without an excessive thread pitch.

The thread section, which is smaller in peripheral direction, is configured as a radially-projecting lug, especially having a rectangular cross section. The lug glides with small contact surfaces at low friction against the assigned thread section. The side surface of the rectangular cross section, which is inclined slightly corresponding to the pitch of the thread, has areal contact whereby excessive surface pressing is avoided. The threaded connection is smooth and can be subjected to high load.

In an advantageous further embodiment, the threaded connection is configured as a four-threaded winding. This is shown to be a practical compromise between a small required rotational movement for tightening and an adequate tightening path for the axial fixing.

In a practical embodiment, a nut is provided with an inner winding and is configured as a cap nut. The nut is preferably arranged on the side of the connecting location facing toward the air guide tube. The cap nut can be rotated independently of the air guide tube and/or independently of the blower housing while the air guide tube is fixed in rotational direction relative to the blower housing.

In a preferred embodiment, the screwable connecting location has a protective device to prevent separation which can especially be a latch device and which, on one side of the connecting location, has at least one latch spring and, on the opposite-lying side, has at least one spring receptacle. When tightening the screw connection, the latch spring latches into the spring receptacle and prevents an automatic release of the screw connection. For release, it is first necessary to actively take the latch spring out of the spring receptacle whereby the screw connection is cleared in the release direction. An unintended release is prevented. At the same time, the release protective device in the latch state is an indication that the screw connection has been adequately tightened.

The number of spring receptacles is preferably equal to the number of turns of the screw connections while only one latch spring in total is provided. The multi-thread winding can be pulled tight in any desired relative rotational angle position. Without paying attention to the pair formation of thread sections, it is ensured that the latch spring can snap into a corresponding spring receptacle when tightening. One individual latch spring is adequate as a release protective device. To start the release of the screw connection, only the release of a single latch connection is required which can take place in a simple manner and even manually and without tools.

In an advantageous embodiment, the latch spring is configured to be resilient in axial direction. The spring receptacles are open at the end face and radially toward the outside in axial direction. When tightening the screw connection, the latch springs first slide with increasing axial pretensioning on the end face, for example, of the cap nut before they snap in axial direction into the spring receptacles. To release, for the embodiment of the spring receptacle, which is open radially toward the outside, a simple intervention on the latch spring with a finger, an improvised tool (for example, in the form of a branch) or with a screwdriver is possible.

In a preferred alternate embodiment, the latch spring is enclosed by the nut in the assembled state. The nut has a tool opening for unlatching the latch spring. The latch spring is protected against dirt during operation by the nut; however, it can be easily released with a screwdriver passed through the tool opening.

In an advantageous embodiment, the latch spring is especially a plastic spring configured as one piece with a housing part of the blower or with the nut. While providing reliable function, the construction and manufacturing complexity is low. In a preferred alternate embodiment, the latch spring is a wire spring which combines a high mechanical loadability with large possible spring paths.

BRIEF DESCRIPTION OF THE DRAWINGS

The invention will now be described with reference to the drawings wherein:

FIG. 4 is an exploded side elevation view of the arrangement of FIG. 1 showing details of the connecting location configured as a threaded connection;

FIG. 5 is a perspective and partially schematic detail view of the threaded connection of FIG. 4 with details of the angular extent of the thread sections;

DESCRIPTION OF THE PREFERRED EMBODIMENTS OF THE INVENTION

Figure 1:
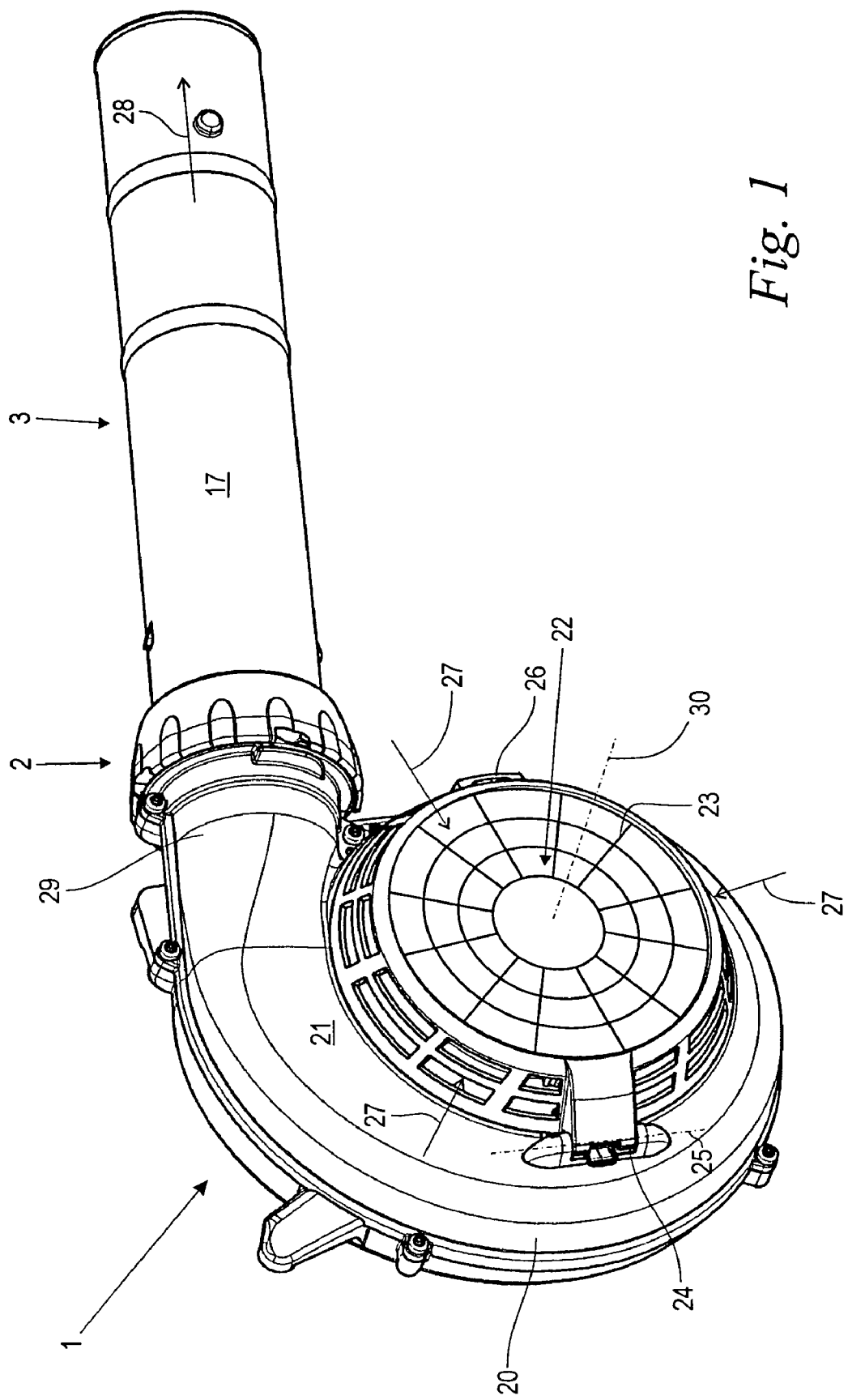
FIG. 1 is a perspective view of the blower of a blower/suction apparatus having an assembled air guide tube configured as a blower tube and having an intake opening covered by an intake lattice.

FIG. 1 is a perspective view showing a blower 1 of a portable handheld suction/blower apparatus. To facilitate clarity, a drive motor for the blower 1 is not shown. The drive motor is configured as a two-stroke internal combustion engine. An electric motor can also be provided for driving the blower 1. In the embodiment shown, the blower 1 is configured as a radial blower having a blower spiral 20 in which a blower wheel 21 (not shown) is rotatably journalled about a rotational axis 30 and driveable in rotation by the drive motor. The blower spiral 20 has, at the center of its side surface, an intake opening 22 which is covered by an intake lattice 23 in the configuration of the blower shown. The intake lattice 23 is pivotally journalled on one end by means of a hinge 24 about a pivot axis 25 running in the upward direction. In the opposite-lying end, the intake lattice 23 is held by means of a latching device 26.

The blower spiral 20 opens in the peripheral direction, referred to the rotational axis 30, into a tangentially-aligned discharge stub 29. An air guide tube 3 is connected coaxially to the stub 29 while forming a connecting interface or connecting location 2. The apparatus is shown in the blower configuration wherein the air guide tube 3 is formed by a blower tube 17. During operation, in this configuration, air is drawn by suction through the intake lattice 23 and the intake opening 22 in correspondence to the arrows 27 in radial and axial direction. In the blower 1, an air flow forms as a consequence of the rotation of the blower wheel 21. The air flow is guided through the blower tube 17 and is discharged at the free end of the blower tube in the direction of the arrow 28.

The blower tube 17 is held by the operator at a shallow angle relative to a ground surface to be cleaned. For example, leaves can be blown together to form a pile with the air flow guided by the blower tube 17.

Figure 2:
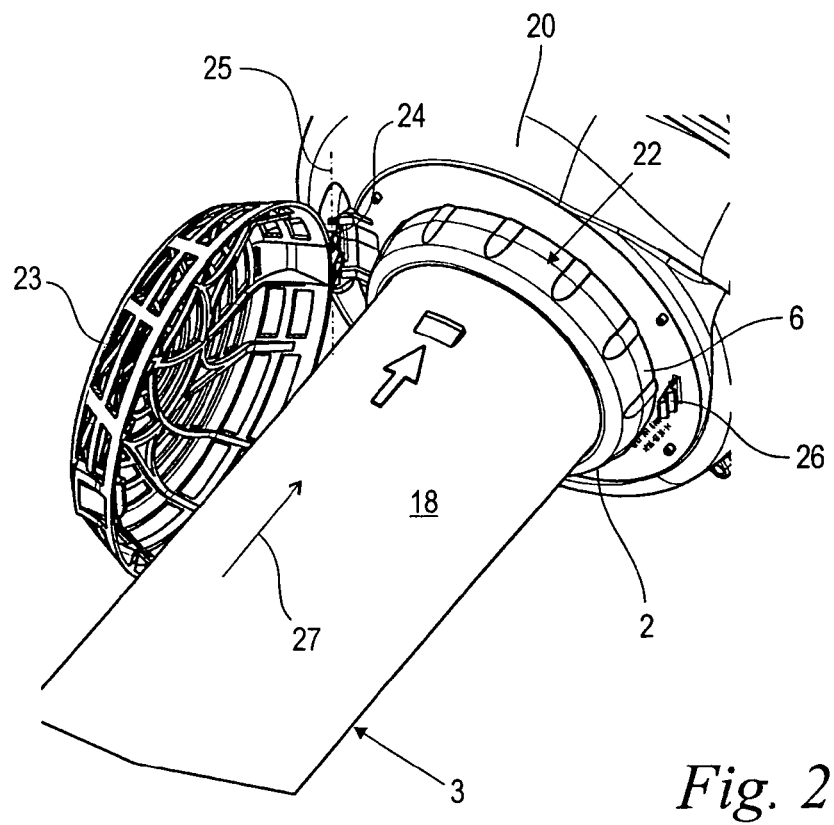
FIG. 2 is an enlarged perspective detail view of the blower of FIG. 1 in a suction configuration having an air guide tube connected to the intake opening and configured as a suction tube.

FIG. 2 is a detail view showing the apparatus of FIG. 1 in the region of the intake opening 22 with the blower being in the suction configuration. The latching device 26 of the intake lattice 23 is disengaged. The intake lattice 23 is flipped open about the pivot axis 25 of the hinge 24 against the pretension force of a closing spring (not shown).

Alternatively to the blower configuration of FIG. 1, a further air guide tube 3 in the form of a suction tube 18 is connected to the intake opening 22 coaxially to the rotational axis 30 (FIG. 1) while forming a further connecting location 2. The suction tube 18 is attached for this purpose by means of a nut 6 to the blower spiral 20 on the side surface thereof while covering the intake opening 22. During operation, the suction tube 18 is directed toward the ground surface to be cleaned. A suction air flow, which is channeled in the suction tube 18 in the direction of arrow 27, sucks up dirt, leaves or the like.

Figure 3:
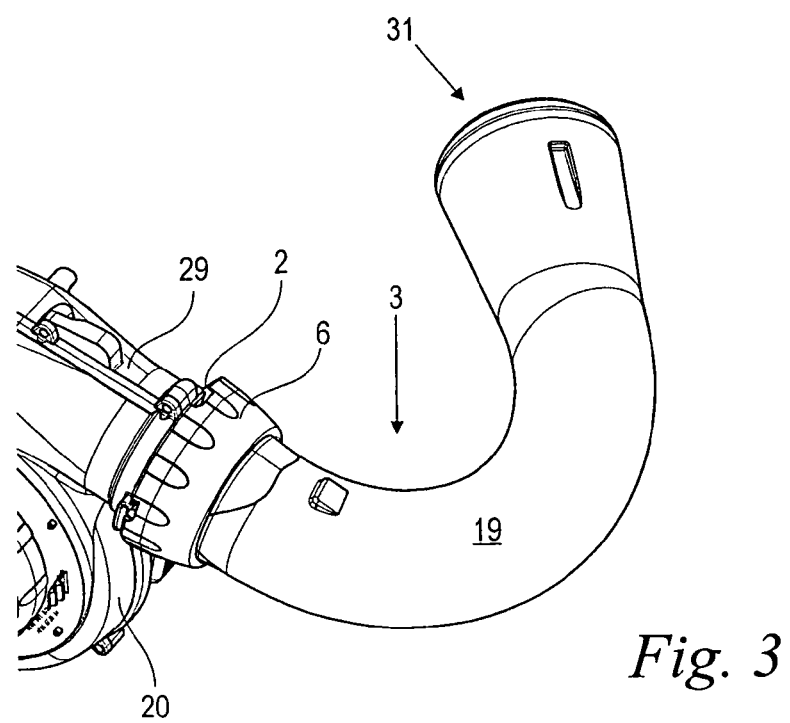
FIG. 3 is a further detail perspective view of the arrangement of FIG. 2 in the region of the discharge stub with an air guide tube connected thereto and configured as a discharge tube.

FIG. 3 shows a further detail view of the apparatus of FIG. 2 in the suction configuration. A further air guide tube 3 in the form of a curved discharge tube 19 is attached to the discharge stub 29 of the blower spiral 20 while forming a further connecting location 2. The discharge tube 19 is attached to the discharge stub 29 by means of a nut 6. The free end 31 is expanded to have a funnel-like shape and this end 31 is provided for connecting a receptacle bag thereto. The material, which is drawn by suction through the suction tube 18 (FIG. 2), is blown during suction operation through the discharge tube 19 into the receptacle bag (not shown).

FIG. 4 shows, as an exploded view in side elevation, the blower apparatus of FIG. 1 with details for configuring the connecting location 2 between the blower tube 17 and the discharge stub 29. The various embodiments of this connecting location 2 shown here and in the FIGS. which follow are applicable in the same configuration also for the connecting location 2 of FIGS. 2 and 3 as well as for further connecting locations, for example, on the suction tube of a nut harvester or the like.

FIG. 4 shows that the connecting location 2 is configured at least as a two-stage threaded connection 9 (shown in greater detail in FIG. 5) and includes an outer winding 5 as well as an inner winding 8 shown in FIG. 5. A nut 6 is provided which can threadably engage the outer winding 5 on the discharge stub 29. The nut 6 lies on the end of the connecting location 2 facing toward the air guide tube 3. An arrangement can also be practical wherein, oppositely, the outer winding 5 is on the end of the air guide tube 3 and a corresponding internal thread is on the end of the housing part 16 of the blower spiral 20. The outer winding 5 includes a number of thread sections 4 which lie distributed uniformly over the periphery of the threaded connection 9 or over the connecting location 2 and lie in the peripheral direction at a distance one from the other.

In the region of its end facing toward the discharge stub 29, the blower tube 17 has a peripherally-extending annular flange 32 projecting radially to the outside. The nut 6 is configured as a cap nut in the embodiment shown. In the assembled state, the cap nut is pushed over the air guide tube 3 and covers the annular flange 32. An arrangement can also be practical wherein the nut 6 is connected rotation tight or even as one piece with the air guide tube 3 or as one piece with the housing part 16.

A latching protective device 12 to prevent separation is provided for the threaded connection 9 or the connecting location 2. In the embodiment shown, this protective device includes an individual latch spring 13 on the end of the discharge stub 29 as well as a number of spring receptacles 14 on the tube end of the connecting location 2. The spring receptacles 14 are formed in the end of the nut 6 facing toward the discharge stub 29. Details of the protective device 12 are described in greater detail hereinafter in connection with FIGS. 8 to 10.

FIG. 5 shows the threaded connection 9 of FIG. 4 in a perspective, partially schematic view. In total, four outer thread sections 4 of the outer winding 5 are provided and are uniformly distributed over the periphery. The connecting location 2 is subdivided into four equal angular segments 10 on the side of the outer winding 5 because of the four outer thread sections 4 distributed uniformly over the periphery. The angular extent $\gamma$ of the angular segments 10 is 90° for the selected number of outer thread sections 4. The outer thread sections 4 are each identical and each has an angular extent $\alpha$ in the peripheral direction which is approximately 5°.

An inner winding 8 is provided on the inner side of the nut 6 corresponding to the outer winding 5. The inner winding 8 has a total of four inner thread sections 7 projecting radially inwardly and distributed uniformly over the periphery. The inner thread sections are formed as ribs having a uniform cross section. The ribs run inclined in the peripheral and axial directions. The four inner thread sections 7 subdivide the connecting location 2 on the inner thread side likewise into four uniform angular segments 10 which likewise have an angular extent $\gamma$ of 90° for the selected number of four. A deviating number of outer thread sections 4 and inner thread sections 7 can also be provided. In correspondence to the selected number, the angular extent $\gamma$ results from 360° divided by the number of the outer thread sections 4 or the inner thread sections 7. The individual inner thread sections 7 each have an angular extent $\beta$ of approximately 40° in the peripheral direction.

When closing the connecting location 2, the outer thread sections 4 form respective coacting pairs with correspondingly assigned inner thread sections 7. The sum of the angular extents ($\alpha$, $\beta$) of one such individual pair of an outer thread section 4 and an inner thread section 7 amounts to 45° in the embodiment shown corresponding to the above-mentioned angular data and therefore amounts to half of the angular extent $\gamma$ of 90°. According to the invention, the situation is sought that the sum of the angular extents ($\alpha$, $\beta$) is at least less than the angular extent $\gamma$ and at least should not amount to more than approximately 75% of the angular extent $\gamma$. Preferably, a range is selected wherein the sum of the angular extents ($\alpha$, $\beta$) lies between and including the above-mentioned 75% and including the 50% of the angular extent $\gamma$ provided here by way of example.

An embodiment can also be practical wherein the number of outer thread sections 4 deviates from the number of inner thread sections 7. Here, a whole number multiple should be selected in each case. For example, the four shown inner thread sections 7 can lie opposite only two outer thread sections 4 or vice versa. In this case, the above-mentioned angular definitions apply for the angular extent $\gamma$ of that thread side having the higher number of thread sections. This number also provides the number of threads of the threaded connection 9. Accordingly, a quadruple thread is provided in the embodiment shown.

The perspective illustration of FIG. 5 shows that a peripherally-extending inner flange 33 is provided on the rearward end face of the nut 6. The inner flange 33 is directed radially inwardly and the function thereof is explained in connection with FIGS. 6 to 9. Furthermore, a total of four spring receptacles 14 are provided on the opposite-lying end face of the nut 6 facing toward the outer winding 5. The spring receptacles 14 are distributed uniformly over the periphery and correspond in number to the number of threads; whereas, only a single latch spring 13 is provided at the discharge stub 29 in FIG. 4. The spring receptacles 14 are open in axial and radial direction toward the outside and offer a free access. It can also be advantageous to place only a single spring receptacle 14 opposite a number of four latch springs 13.

With reference to both FIGS. 4 and 5, an engagement of the threaded connection 9 in the assembly of the air guide tube 3 is established in such a manner that first the nut 6 is pushed in axial direction toward the outer winding 5. Peripheral free spaces having an angular extent $\delta$ lie between the individual inner thread sections 7. The angular extent $\delta$ adds to the angular extent $\beta$ of an inner thread section 7 to form the angular extent $\gamma$ of an angular segment 10. According to the above-mentioned angle definition, the angular extent $\delta$ of the free space is significantly greater than the angular extent $\alpha$ of an individual outer thread section 4 which, in a suitable relative rotational position, can easily be passed in axial direction through the peripheral free space between the inner thread sections 7. The passthrough takes place in axial direction to the extent that the outer thread sections 4 lie axially on the inside of the inner thread section 7. With a short rotational movement of the nut 6 in a closing direction (indicated by arrow 39), the outer thread sections 4 engage behind the assigned inner thread sections 7. The connecting location 2 is pulled in the axial direction.

If, inadvertently, a relative rotational angle position of the inner winding 8 is selected relative to the outer winding 5 during axial insertion wherein the outer thread sections 4 strike the inner thread sections 7 in axial direction from the outside, only a rotation of the nut 6 is required to make possible the above-mentioned complete axial insertion. This rotation of the nut 6 corresponds maximally to the sum of the angle extents ($\alpha$, $\beta$) of a single pair of thread sections (4, 7). As a consequence of the spiral inclined position of the inner thread sections 7, the outer thread sections 4 slide during a rotational movement of the nut 6 on the inner thread sections 7 and can, simultaneously, execute an axial insert movement as a consequence of the inclined position of the inner thread sections 7. The outer thread sections 4 are on the end surface and lie axially outside. This axial insert movement continues to the extent that, with a further rotation of the nut 6, the inner thread sections 7 automatically engage the outer thread sections 4 with their axial inner sides and pull them tight.

The dimensions for the angle extents ($\alpha$, $\beta$) are selected by way of example. The angle extent $\alpha$ of the outer thread sections 4 is significantly smaller than the angle extent $\beta$ of the inner thread sections. It can also be practical to have the opposite situation wherein the angle extents $\beta$ of the inner thread sections 7 are less than the angle extents $\alpha$ of the outer thread sections 4. Also, deviating relative size ratios of the angular extents ($\alpha$, $\beta$) can deviate with respect to each other without the described sum of the angular extents ($\alpha$, $\beta$) changing.

Figure 6:
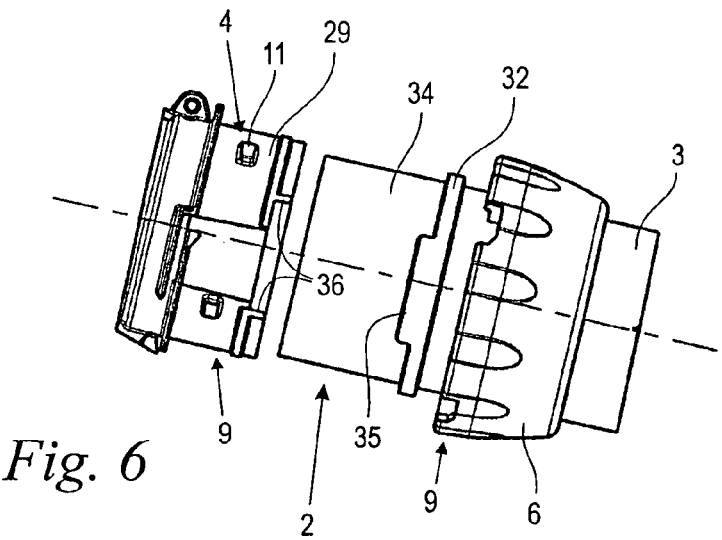
FIG. 6 shows an enlarged detail schematic of the connecting location of FIG. 4 in side elevation view at the start of the assembly procedure.

The fixing operation of the threaded connection 9 at the above-mentioned connecting location 2 is shown as a sequence in FIGS. 6 to 9. FIG. 6 shows, in detail, the connecting location 2 at the start of the fixing operation. The cap nut 6 is pushed onto the air guide tube 3 from the free end and pushed up close to the annular flange 32 of the air guide tube 3. An end of the air guide tube 3, which faces toward the discharge stub 29, is configured as an insert end 34 which is provided for a virtually play-free insertion into the discharge stub 29. At the side facing toward the discharge stub 29, the annular flange 32 has a projection 35 which is received by two ribs 36 on the end face of the discharge stub 29. The projection 35 protrudes in axial direction.

FIG. 6 also shows that the outer thread sections 4 are configured as lugs which project radially outwardly and have a rectangular cross section. The rectangular cross section is at an angle in correspondence to the pitch of the inner thread sections 7 (FIG. 5).

Figure 7:
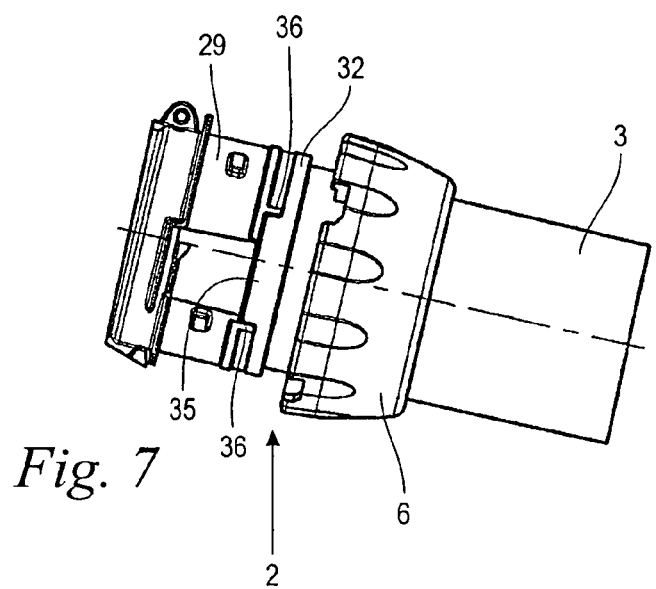
FIG. 7 shows the arrangement of FIG. 6 after the air guide tube is inserted and also showing a nut which is not yet threadably engaged.

FIG. 7 is the next sequence schematic and shows the connecting location 2 of FIG. 6 according to which the insert end 34 (FIG. 6) is pushed into the discharge stub 29. The projection 35 lies play-free between the ribs 36 which, in turn, lie with their ends against the annular flange 32. The air guide tube 3 is thereby fixed in the rotational direction and in the longitudinal direction. The cap nut 6 is pushed in axial direction so far toward the discharge stub 29 that it covers the annular flange 32 (FIG. 6).

Figure 8:
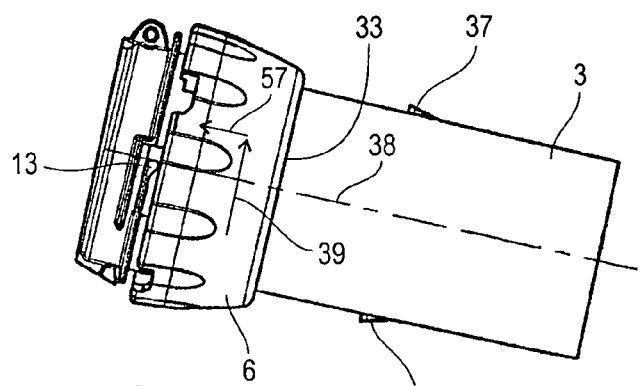
FIG. 8 shows the arrangement of FIGS. 6 and 7 with a cap nut partially tightened in rotational and axial directions.

The next sequence schematic is shown in FIG. 8 wherein the cap nut is pushed in axial direction so far that the individual latch spring 13 lies against the end face of the nut 6 which faces toward the spring. The inner flange 33 approaches in axial direction the annular flange 32 (FIG. 6) and pushes this flange together with the insert end 34 up to the axial stop of FIG. 7 insofar as the insert end was not previously completely inserted. As described in connection with FIG. 5, the outer thread sections 4 shown there are passed through between the inner thread sections 7. The thread sections (4, 7) shown in FIG. 5 mutually engage and pull the nut 6 in the direction of arrow 57 parallel to the longitudinal axis 38 when there is a rotational movement of the nut 6 starting from the rotational angle position of FIG. 8 in the direction of arrow 39 about the longitudinal axis 38 of the air guide tube 3. The latch spring 13 is resilient or elastically yielding in axial direction referred to the longitudinal axis 38 and is deflected and pretensioned by the same amount likewise in the direction of arrow 57. Two opposite-lying radially projecting lugs 37 are provided which function as an axial protective device for the nut 6 so that it does not become separated and lost in the disconnected state.

Figure 9:
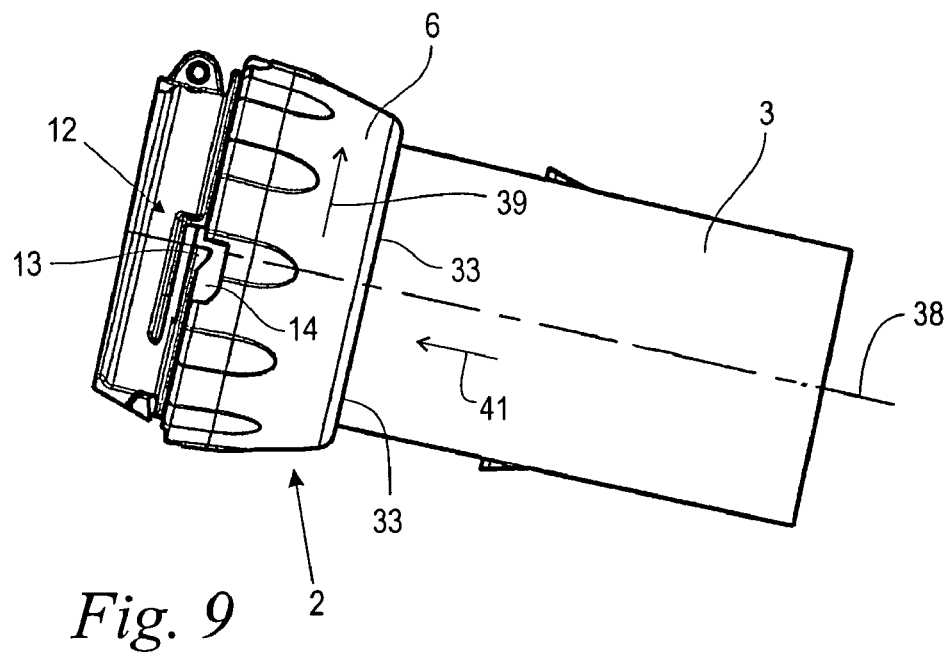
FIG. 9 shows the arrangement of FIGS. 6 to 8 with the cap nut being fully threadably engaged and held by means of a latch protective device for preventing loosening.

The rotation of the nut 6 in the direction of arrow 39 takes place so far until the latch spring 13 latches into one of the four spring receptacles 14 as shown in FIG. 9. The nut 6 is completely tightened. The inner flange 33 holds the air guide tube 3 against its annular flange 32 (FIG. 6) in axial direction. Without additional measures, a rotation of the nut 6 in opposition to the closing direction, which is given by arrow 39, is prevented by the latch spring 13 engaging in the spring receptacle 14. A protective device 12 to prevent separation is formed for the nut 6, that is, for the connecting location 2.

Furthermore, the latch spring 13, which is latched in the spring receptacle 14, functions as an indicator that the nut 6 is pulled sufficiently tight in its closing position 39 and that, as a consequence, the air guide tube 3 is pulled tight axially referred to the longitudinal axis 38 in a pull-tight direction shown by arrow 41.

Figure 10:
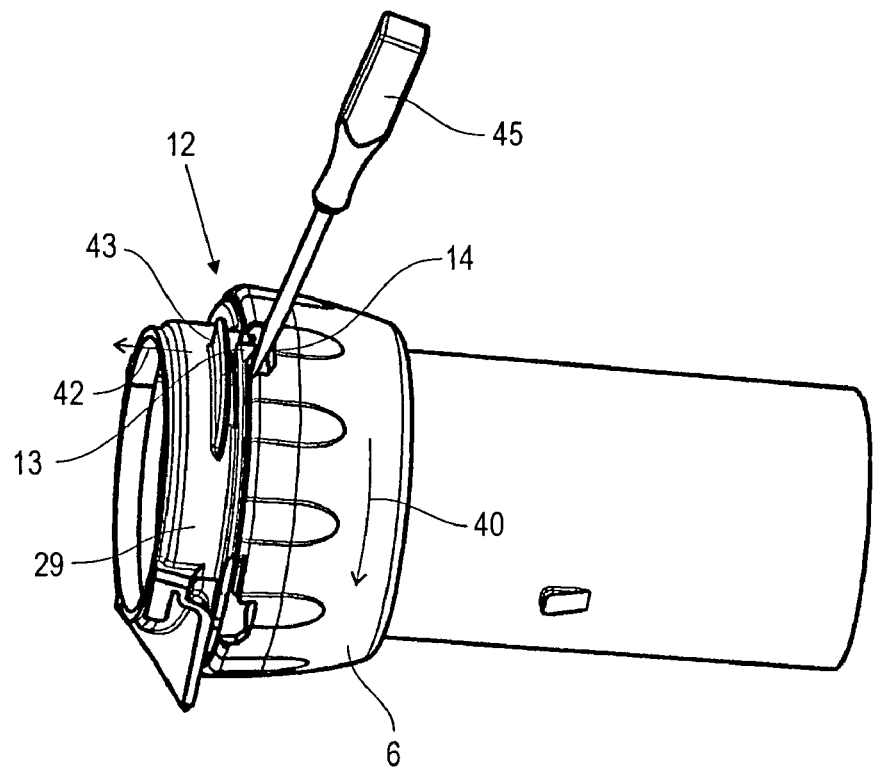
FIG. 10 is a perspective view of the arrangement of FIG. 9 with a tool in place for disengaging the protective device.

FIG. 10 shows another perspective view of the arrangement of FIGS. 6 to 9 wherein a tool 45 (for example, a screwdriver) is introduced radially from the outside into the spring receptacle 14 open in this direction to unlatch the protective device 12. With the tool 45, the latch spring 13 can be levered out of the spring receptacle 14 in the direction of arrow 42 in order to release the nut 6. A release of the nut 6 by rotation in the release direction, which is given by arrow 40, is enabled.

In the embodiment shown, the latch spring 13 is manufactured as one piece with the discharge stub 29 from injection molded plastic. To prevent an overloading of the latch spring 13, a radially protruding stop 43 is formed on the discharge stub 29. The stop 43 limits the axial elastic deflection of the latch spring 13 in the direction of arrow 42.

The construction of the spring receptacle 14 is open in axial and radial direction and can, with a suitable configuration of the latch spring 13, also be unlatched without a tool, for example, with the finger of the operator or with an improvised tool such as a key, branch or the like.

Figure 12:
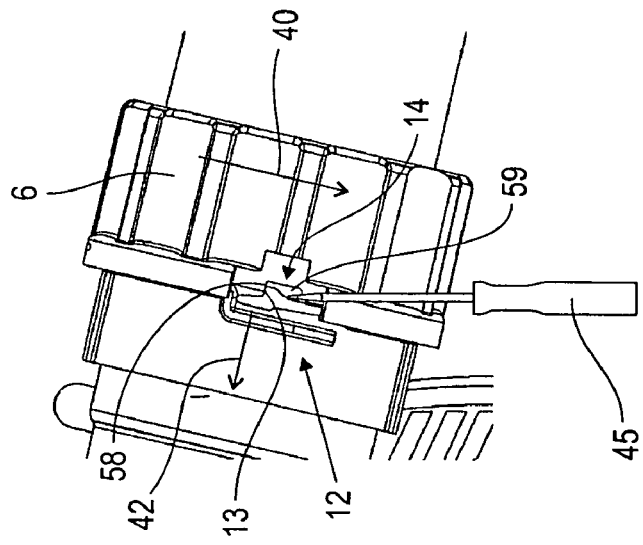
FIG. 12 is a side elevation view of the arrangement of FIG. 11 with a tool set in place for disengaging the protective device.
Figure 11:
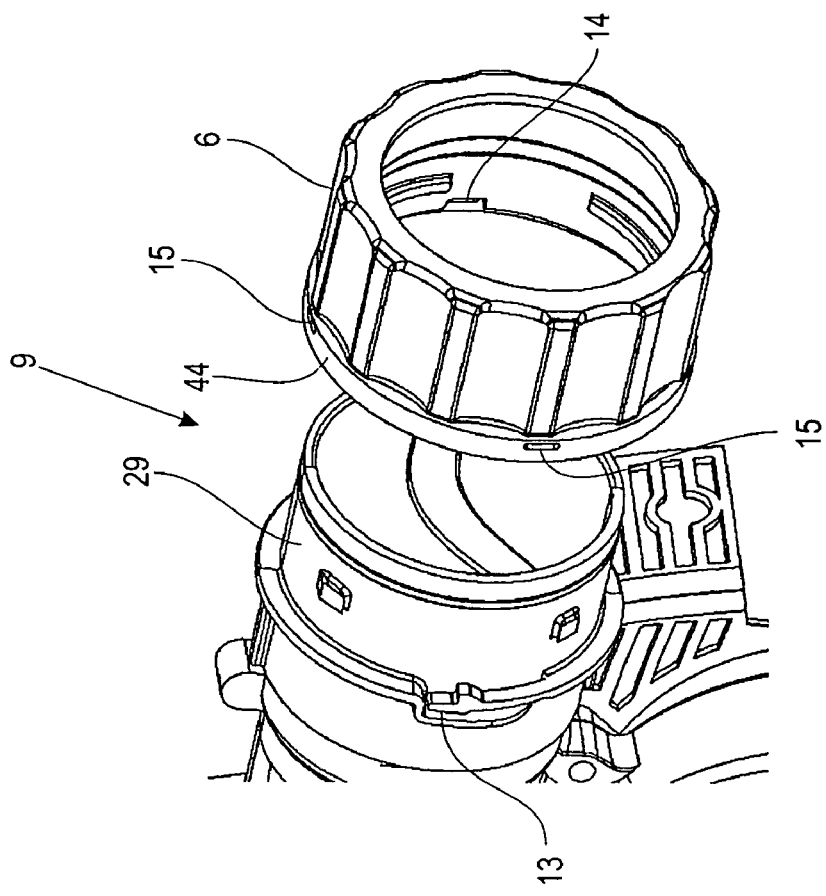
FIG. 11 is an alternate embodiment of the threaded connection having a latch spring covered by the cap nut.

A variation of the threaded connection 9 is shown in FIG. 11. Here, the spring receptacles 14, which are distributed over the periphery of the nut 6, are covered radially outwardly by means of an annular section 44 of the nut 6. The spring receptacles 14 are open in axial direction toward the discharge stub 29 and can take up the latch spring 13 when screwing on the nut 6. The latch spring 13 yields in axial direction. Corresponding to the number of threads of the threaded connection 9 and the same number of spring receptacles 14, a like number of rotational angular positions of the nut 6 is provided for closing the threaded connection. One of the plurality of spring receptacles 14 always lies in suitable rotational angular position for receiving the latch spring 13. Each of the spring receptacles 14 is assigned a tool opening 15 extending through from the outside inwardly through the annular section 44 via which a tool 45 can be passed through inwardly radially from the outside in correspondence to the detail view of FIG. 12. The latch spring 13 lies against a latch edge 58 of the spring receptacle 14 and blocks the nut 6 in the release direction 40. The latch spring 13 leaves a free space 59 in the spring receptacle 14 wherein the tool 45 can be inserted. By pivoting and/or rotating the tool 45, the spring 13 can be moved axially out from the spring receptacle 14 whereby the protective device 12 is unlatched and the nut 6 can be rotated in the release direction 40.

Figure 14:
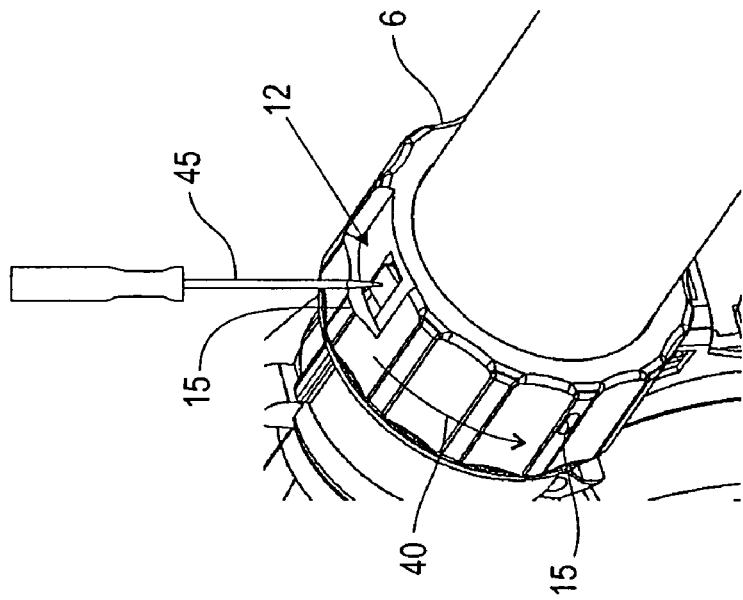
FIG. 14 shows the arrangement of FIG. 13 in the assembled state and with a tool set for unlatching with the tool being guided through a tool opening.
Figure 13:
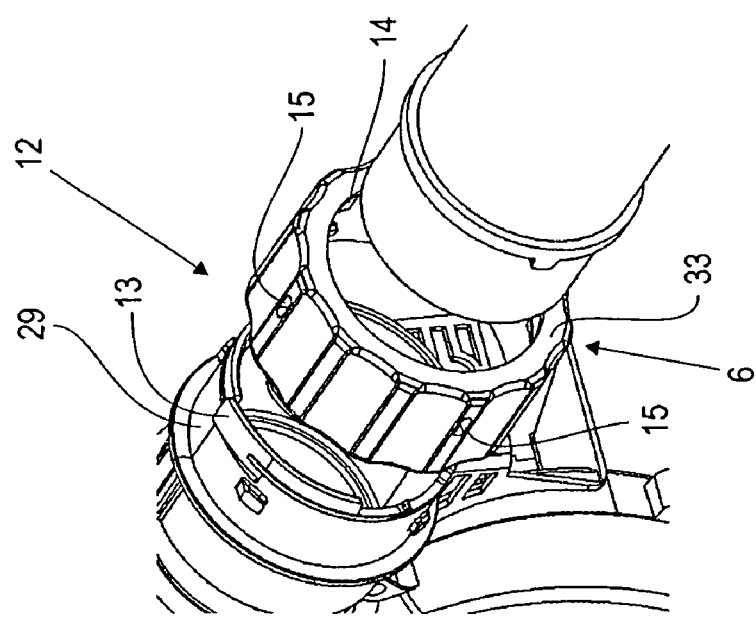
FIG. 13 is a further variation of the protective device having a latch spring yielding in the radial direction.

In a further embodiment of FIGS. 13 and 14, the latch spring 13 is configured as a plastic leaf spring formed as one piece with the discharge stub 29. This plastic leaf spring is resilient or yielding in radial direction inwardly. A plurality of spring receptacles 14 is provided on the inner side of the nut 6 close to the inner flange 33. The spring receptacles are configured as ramps which narrow inclined radially in the peripheral direction. Tool openings 15 extend through the peripheral wall of the nut 6 radially from the outside toward the inside. The tool openings 15 permit a passthrough of tool 45 with which the latch spring 13 (FIG. 13) can be pressed radially inwardly as shown in FIG. 14. The protective device 12 is unlatched and the nut 6 can be released in the direction of arrow 40.

Figure 16:
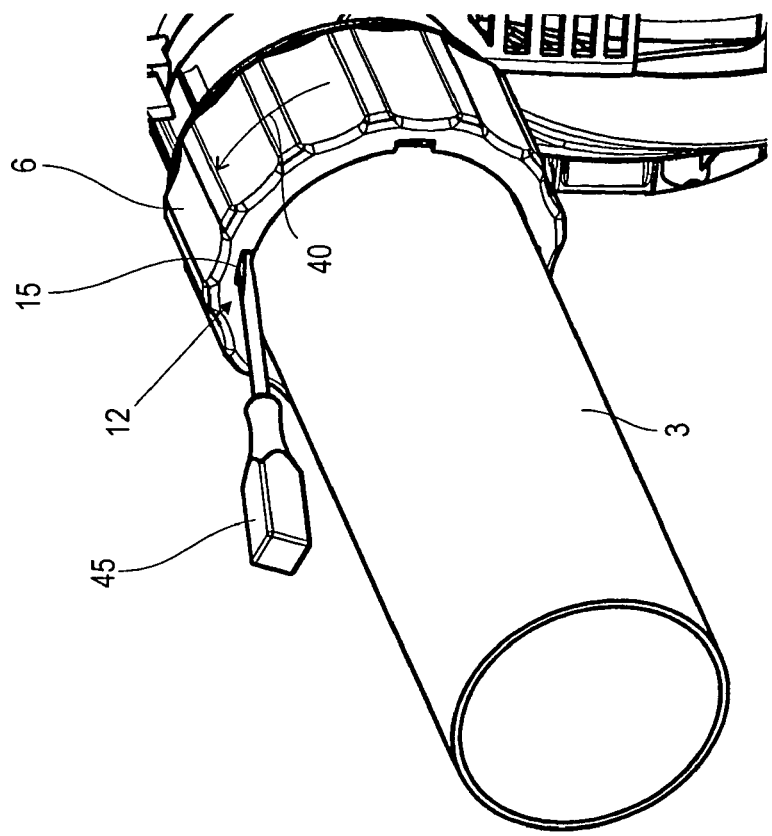
FIG. 16 shows the arrangement of FIG. 15 in the assembled state and with a tool introduced in axial direction in one of the tool openings for unlatching.
Figure 15:
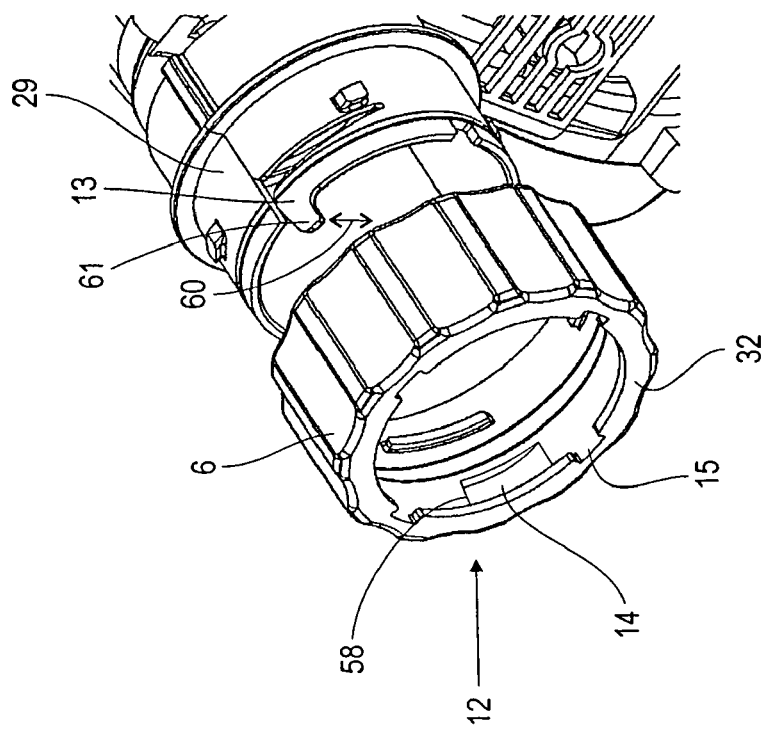
FIG. 15 is a further embodiment having a radially yielding latch spring and tool openings arranged at the end face in the cap nut.

A further embodiment is shown in FIGS. 15 and 16. In this embodiment, the latch spring 13 is yielding or resilient in the direction of a double arrow 60 in radial direction. The latch spring 13 has a tongue 61 projecting in the axial direction. In total, four tool openings 15 are arranged in the annular flange 32 of the nut 6. The latch spring 13, which is configured as one piece with the discharge stub 29, engages (in the manner shown in FIGS. 13 and 14) in a spring receptacle 14 which is ramp-shaped on the inner side. To unlatch the protective device 12, a tool is passed in axial direction through the tool opening 15 as shown in FIG. 16. By rotating and/or tilting the tool 45, the latch spring 13 (FIG. 15) can be pressed radially inwardly (arrow 60) whereby a rotation of the nut 6 in the release direction 40 is enabled.

Figure 18:
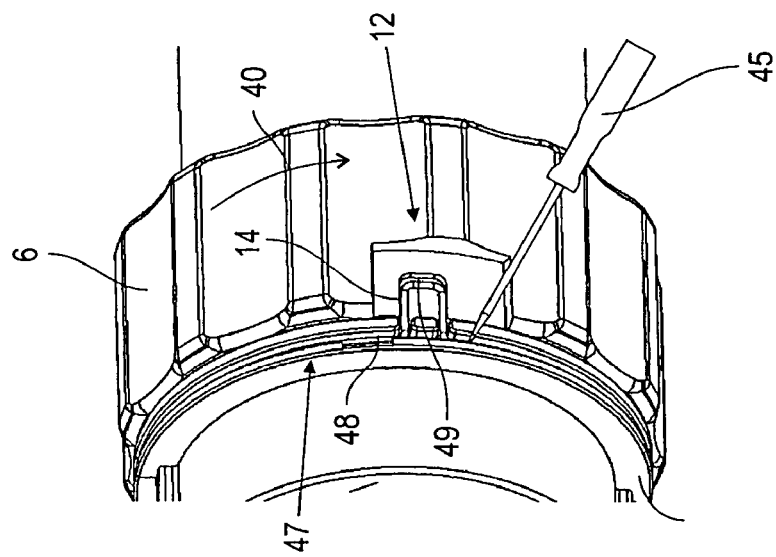
FIG. 18 shows the arrangement of FIG. 17 in the assembled state with a screwdriver set in radial direction on the wire spring for unlatching.
Figure 17:
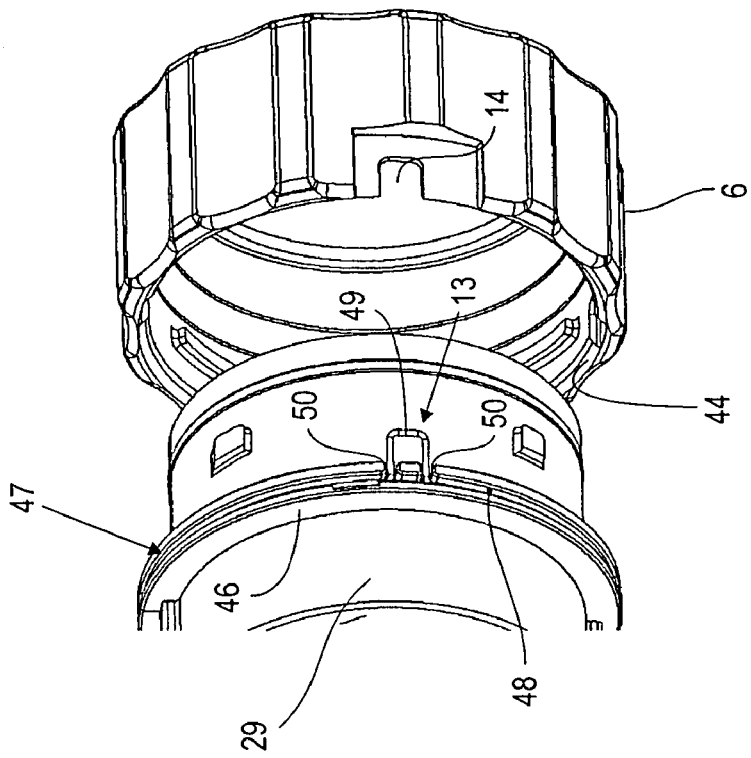
FIG. 17 is a further embodiment having a latch spring in the form of a wire spring yielding in radial direction.

FIGS. 17 and 18 show another embodiment of the invention wherein the latch spring 13 is configured as a wire spring corresponding to the illustration of FIG. 17. The discharge stub 29 is provided with an annular flange 46 wherein a peripherally-extending annular recess 47 is formed. A virtually completely annularly-shaped peripherally-extending spring wire 48 is held form tight in the annular recess 47. The spring wire 48 is bent to an approximately U-shaped spring bracket 49 projecting in axial direction from the annular flange 46. The two legs of the spring bracket 49 are brought out through breakthroughs 50 in the annular flange 46 from the annular recess 47 in the direction of the free end of the discharge stub 29. The spring bracket 49 is arranged at a radial distance to the discharge stub 29. This permits an elastic yielding of the spring bracket 49 in radial direction whereby a radially resilient configuration of the latch spring 13 is formed.

Four spring receptacles 14 are formed in the nut 6 on the inner side of the annular section 44 which fit to the spring bracket 49. The spring receptacles 14 are open in axial direction and are closed toward the outside. The spring receptacles 14 are in the end region of the nut 6 shown in the cutaway view.

FIG. 18 shows that the spring bracket 49 engages in the spring receptacle 14 assigned thereto in axial direction from the outside in the tightened state of the nut 6. In this state, the annular recess 47 with the spring wire 48 is not covered by the nut 6. By means of a tool 45, the spring wire 48 can be pressed in the region of the spring bracket 49 radially toward the inside into the annular recess 47 whereby the spring bracket 49 is also deflected radially inwardly. The spring bracket 49 is no longer in engagement with the spring receptacle 14. The protective device 12 is unlatched and the nut 6 can be opened in the release direction 40.

Figure 20:
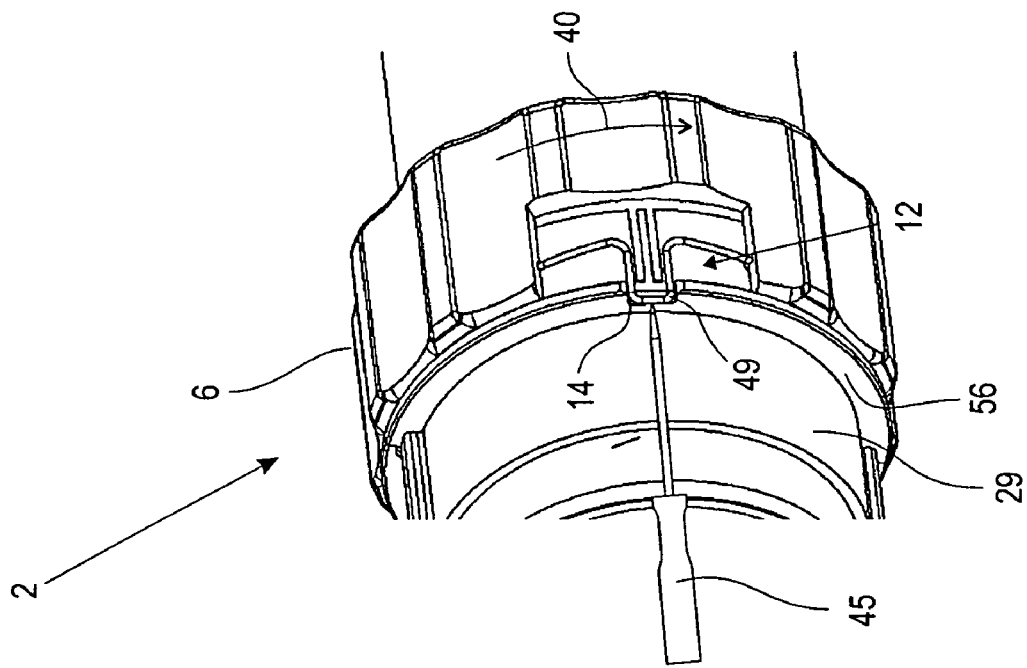
Figure 19:
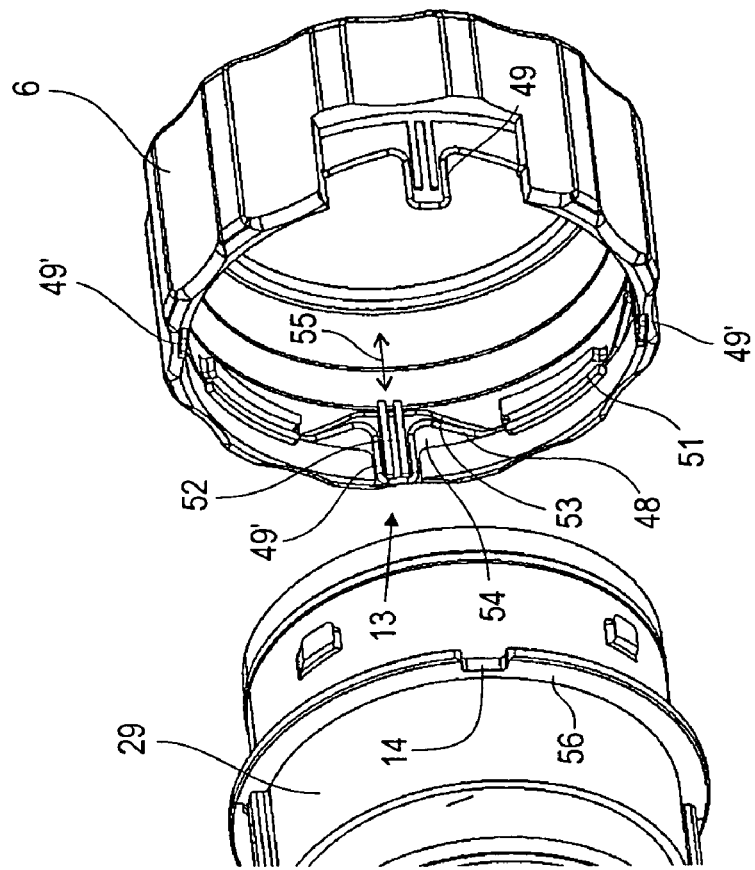
FIG. 19 is an alternate embodiment of the connecting location having latch tongues arranged in the cap nut and made of spring wire; and, FIG. 20 shows the arrangement of FIG. 19 with a latch tongue shown snapped into a spring receptacle on the housing side.

A further embodiment of the invention is shown in FIGS. 19 and 20. Here, a total of four latch springs 13 are attached to the nut 6 while an individual spring receptacle 14 is formed in an annular flange 56 of the discharge stub 29. The latch springs 13 are configured as wire springs from a spring wire 48. The latch spring 13 can also be configured as a plastic spring and is especially formed as one piece with the nut 6. The spring wire 48 is bent to an annular section which, on the inner side of the nut 6, is held in sections of inner peripheral recesses 51. Exposed sections of the wire spring 48 are bent to U-shaped spring brackets (49, 49') projecting in axial direction from the nut 6. The spring brackets (49, 49') engage, in the inner side, an axial guide 52. Edges 53 run in a V-shape starting from the inner peripheral recess 51 in axial direction into the nut 6 and limit a free space 54 within which the spring bracket 49 can move resiliently elastically in axial direction indicated by the double arrow 55. The spring bracket 49 is fixed in the peripheral direction by the axial guide 52. The spring bracket 49 is shown in the axially untensioned position projecting outwardly from the nut 6 while the spring bracket 49' is elastically pressed in axial direction (double arrow 55) and lies flush to the end edge of the nut 6 with its free end.

In the closed state of the connecting location 2, the spring bracket 49 engages in the single spring receptacle 14 of the discharge stub 29 as shown in the detail view of FIG. 20. The spring bracket 49 is resiliently yielding in axial direction and projects axially. The additional three spring brackets 49' are pressed in axial direction and lie resiliently biased against the annular flange 56. To unlatch the protective device 12, the engaging spring bracket 49 can be moved in an axial direction out of the spring receptacle 14 and pressed into the nut 6. If required, the spring bracket 49 can be pressed out manually. To disengage the connecting location 2, the nut 6 can be rotated into its release direction 40.

Unless expressly described otherwise, the embodiments of FIGS. 1 to 20 coincide with each other with respect to their further features and reference numerals.

Embodiments with pawls, spring biased balls or the like can be practical in lieu of the shown preferred embodiments of the latch spring 13 as plastic spring or wire spring. Likewise, it can be practical to exchange the latch springs and the spring receptacles assigned thereto in their positions referred to the partition plane of the connecting location. Also, a reversed configuration can be advantageous in lieu of the shown embodiments having an outer thread on the blower and inner thread on the tube side of the connecting location wherein an inner thread is provided on the blower into which an outer thread of the air guide tube is rotated. It can also be practical to utilize the thread connections and the protective devices shown independently of each other.

It is understood that the foregoing description is that of the preferred embodiments of the invention and that various changes and modifications may be made thereto without departing from the spirit and scope of the invention as defined in the appended claims.

What is claimed is:

1. A portable handheld suction/blower apparatus comprising:
   a motor-driven blower;
   an air guide tube for conducting a flow of air therethrough generated by said motor-driven blower;
   said motor-driven blower and said air guide tube conjointly defining a connecting interface whereat said air guide tube is connected to said motor-driven blower;
   said connecting interface defining a periphery and being configured as at least a two-thread thread connection;
   said thread connection including a number of pairs of outer thread sections of an outer winding and inner thread sections of an inner winding;
   one of said thread sections of each one of said pairs extending over an angular extent ($\alpha$) and the other one of said thread sections of said one pair extending over an angular extent ($\beta$);
   said periphery of said connecting interface being subdivided into a number of angular segments corresponding to the number of said pairs with each of said angular segments extending over an angular extent ($\gamma$);
   the sum of the angular extents ($\alpha$, $\beta$) of a pair of individual ones of said outer and inner thread sections being overall less than the angular extent ($\gamma$) of the angular segment corresponding to said pair;
   said connecting interface including a latching protective device to prevent separation of said air guide tube from said motor-driven blower;
   said protective device including at least one latch spring on one side of said connecting interface and at least one spring receptacle on the opposite-lying other side of said connecting interface; and,
   the number of said spring receptacles corresponding to the number of threads of said thread connection.

2. The portable handheld suction/blower apparatus of claim 1, wherein said at least one latch spring is a single latch spring.

3. The portable handheld suction/blower apparatus of claim 1, wherein said latch spring is configured so as to be resilient in radial direction.

4. The portable handheld suction/blower apparatus of claim 1, wherein said latch spring is configured so as to be resilient in axial direction; and, said spring receptacle is open in axial direction and radially outwardly.

5. A portable handheld suction/blower apparatus comprising:
   a motor-driven blower;
   an air guide tube for conducting a flow of air therethrough generated by said motor-driven blower;

said motor-driven blower and said air guide tube conjointly defining a connecting interface whereat said air guide tube is connected to said motor-driven blower;

said connecting interface defining a periphery and being configured as at least a two-thread thread connection;

said thread connection including a number of pairs of outer thread sections of an outer winding and inner thread sections of an inner winding;

one of said thread sections of each one of said pairs extending over an angular extent ($\alpha$) and the other one of said thread sections of said one pair extending over an angular extent ($\beta$);

said periphery of said connecting interface being subdivided into a number of angular segments corresponding to the number of said pairs with each of said angular segments extending over an angular extent ($\gamma$);

the sum of the angular extents ($\alpha$, $\beta$) of a pair of individual ones of said outer and inner thread sections being overall less than the angular extent ($\gamma$) of the angular segment corresponding to said pair;

said connecting interface including a latching protective device to prevent separation of said air guide tube from said motor-driven blower;

said protective device including at least one latch spring on one side of said connecting interface and at least one spring receptacle on the opposite-lying other side of said connecting interface; and, said thread connection further comprising a cap nut and said latch spring being enclosed by said cap nut when said latch spring is mounted; and, said cap nut having an opening for permitting access to said latch spring with a tool for unlatching said latch spring.

6. The portable handheld suction/blower apparatus of claim 5, wherein said motor-driven blower includes a housing and said latch spring is a plastic spring configured as an integral part of said housing or said cap nut.

7. The portable handheld suction/blower apparatus of claim 5, wherein said latch spring is a wire spring.

8. The portable handheld suction/blower apparatus of claim 5, wherein said air guide tube is configured as: a blower tube, an intake tube and/or a discharge tube.

* * * * *

UNITED STATES PATENT AND TRADEMARK OFFICE
CERTIFICATE OF CORRECTION

| | | |
|---|---|---|
| PATENT NO. | : 8,104,138 B2 | Page 1 of 1 |
| APPLICATION NO. | : 11/356050 | |
| DATED | : January 31, 2012 | |
| INVENTOR(S) | : Harald Schliemann and Manfred Rabis et al. | |

It is certified that error appears in the above-identified patent and that said Letters Patent is hereby corrected as shown below:

<u>In column 8</u>:
Line 28: insert -- in -- after "pulled".

<u>In column 11</u>:
Line 21: insert -- in -- after "pressed".
Line 48: insert -- in -- after "pressed".

Signed and Sealed this
Nineteenth Day of June, 2012

David J. Kappos
*Director of the United States Patent and Trademark Office*